United States Patent

Leiber

[11] 4,126,996
[45] Nov. 28, 1978

[54] HYDRAULIC BRAKE BOOSTER FOR A VEHICULAR BRAKE SYSTEM

[75] Inventor: Heinz Leiber, Leimen, Fed. Rep. of Germany

[73] Assignee: Robert Bosch GmbH, Stuttgart, Fed. Rep. of Germany

[21] Appl. No.: 770,135

[22] Filed: Feb. 18, 1977

[30] Foreign Application Priority Data

Feb. 21, 1976 [DE] Fed. Rep. of Germany ....... 2607140

[51] Int. Cl.² .............................................. B60T 13/00
[52] U.S. Cl. ................................... 60/547 R; 60/554; 60/579; 60/581; 60/593
[58] Field of Search ................ 60/547, 548, 581, 593, 60/546, 582, 554, 579; 303/114

[56] References Cited

U.S. PATENT DOCUMENTS

| | | | |
|---|---|---|---|
| 2,321,479 | 6/1943 | Freeman | 60/574 |
| 3,176,467 | 4/1965 | Van House | 60/548 |
| 3,827,242 | 8/1974 | Belart | 60/582 |
| 3,827,759 | 8/1974 | Belart | 60/582 |
| 3,874,745 | 4/1975 | Peruglia | 60/547 |
| 3,918,765 | 11/1975 | Hayashida | 60/582 |
| 3,979,153 | 9/1976 | Ingram | 303/114 |

FOREIGN PATENT DOCUMENTS

| | | | |
|---|---|---|---|
| 2,343,882 | 4/1975 | Fed. Rep. of Germany | 60/582 |
| 1,345,951 | 2/1974 | United Kingdom | 60/547 |

Primary Examiner—Martin P. Schwadron
Assistant Examiner—Abraham Hershkovitz
Attorney, Agent, or Firm—Edwin E. Greigg

[57] ABSTRACT

An improved hydraulic brake booster including a booster cylinder and a dual-circuit main cylinder connected together. The brake booster includes a booster piston which defines a storage pressure chamber and the dual-circuit main cylinder includes a double piston which defines a primary pressure chamber. A separating wall is provided which is connected to both the booster cylinder and the dual-circuit main cylinder and separates the storage pressure chamber from the primary pressure chamber.

2 Claims, 1 Drawing Figure

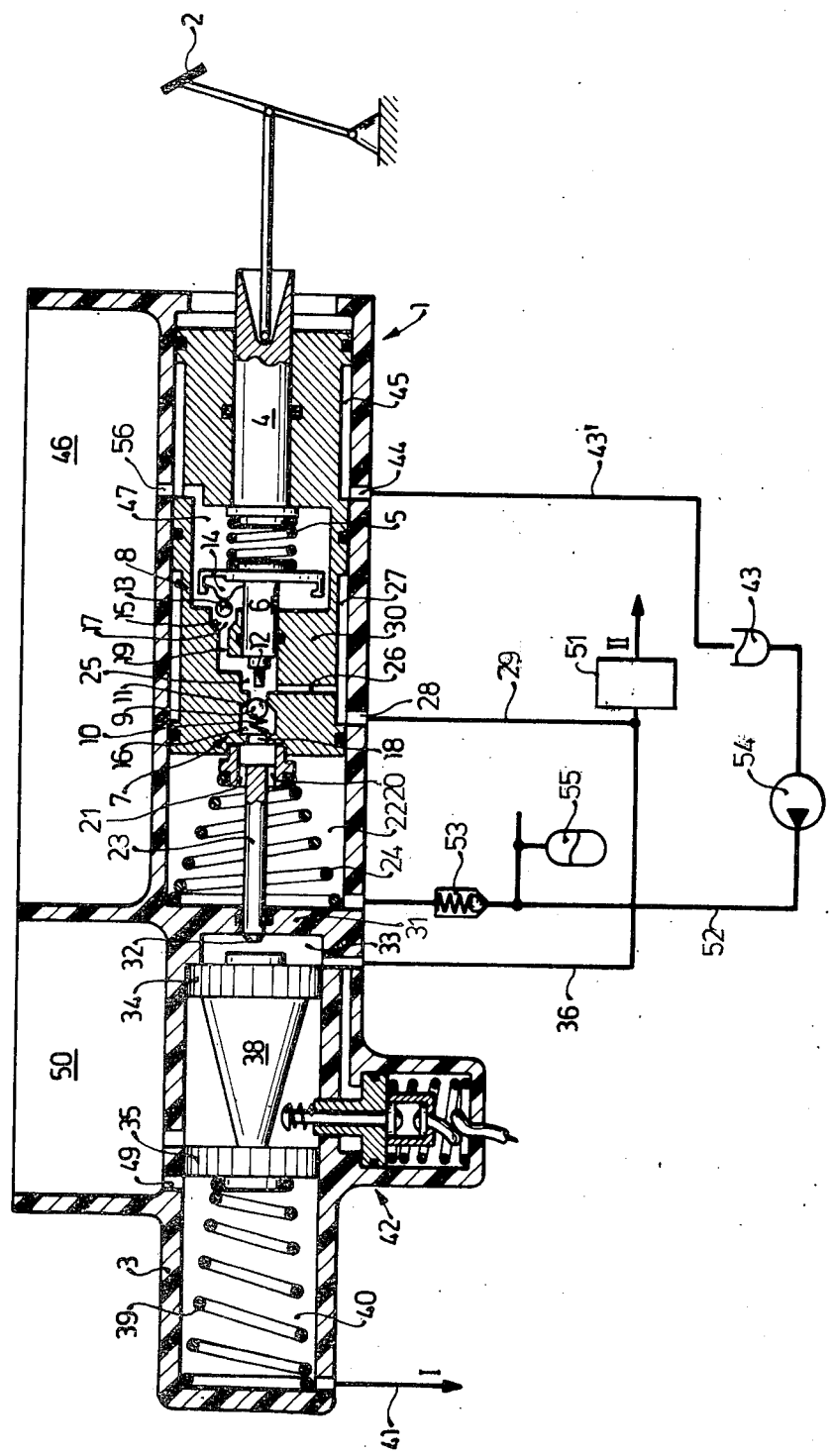

4,126,996

HYDRAULIC BRAKE BOOSTER FOR A VEHICULAR BRAKE SYSTEM

BACKGROUND OF THE INVENTION

The present invention relates to a hydraulic brake booster for a vehicular brake system, which is actuated by means of a brake pedal. The brake booster includes a travel limiting spring and a control valve which controls both the interconnection of a storage source with a booster cylinder and the interconnection of the booster cylinder, which contains a booster piston, with a relief station. The brake booster is connected to a hydraulic dual-circuit main cylinder having a primary and secondary side sealed from each other by a double piston.

A similar brake booster is disclosed in German Pat. No. 2,001,483, issued July 30, 1970. With brake boosters of this type, a problem exists in that the hydraulic supply of the main cylinder refill container can be depleted after repeated lockage avoidance operations. It is well known that, in order to prevent this problem, a special return pump is used which conveys the brake pressure medium drawn off by the wheel brake cylinders back to the main cylinder, see British Pat. No. 1,416,645, issued Dec. 3, 1975. Such a return pump is, however, cumbersome and costly.

OBJECT AND SUMMARY OF THE INVENTION

It is a principal object of the present invention to provide a brake booster of the above-cited kind which is integrated into a lockage avoidance system such that no return pump is required. In addition, the lockage avoidance surveillance of the one brake circuit shall also be determinant for the other brake circuit.

This object is achieved, according to the present invention, by the provision of a hydraulic brake circuit connected in a known manner via a branch line with a primary pressure chamber lying on the primary side of the double piston, of a storage pressure chamber incorporated at that face surface of the booster piston which faces the main cylinder, and of a separation wall provided between the primary pressure chamber and the storage pressure chamber.

BRIEF DESCRIPTION OF THE DRAWING

The single FIGURE illustrates, partially in cross section, the hydraulic brake booster and associated hydraulic circuit according to the present invention.

DESCRIPTION OF THE PREFERRED EMBODIMENT

There is illustrated a hydraulic brake booster 1 located between a pedal 2 and a hydraulic dual-circuit main cylinder 3 of tandem construction design. The brake circuit I is the front brake circuit, and the brake circuit II is the rear brake circuit.

The brake booster 1 has an actuating rod 4 which engages a push rod 6 of a double valve 7, 8 via a travel limiting spring 5. The valve 7 of the double valve 7, 8 is an inlet valve; it is located coaxially relative to the actuating rod 4 and has a spherical closure body 9 which sits ordinarily on its valve seat 11 under the force of a spring 10, and which can be lifted off its seat 11 by means of a push rod extension 12 of the push rod 6. The other valve 8 is the outlet valve of the brake booster 1; it is located offset from the center and parallel to the axis of the rods 4 and 6. It includes a closure body 13 which, like closure body 9, is likewise constructed as a sphere. The closure body 13, however, is carried by a projection 14 of the push rod 6 and is intended to cooperate with a valve seat 15.

The two valve seats 11 and 15 are situated at enlargements 16 and 17 of the ducts 18 and 19 provided within a booster piston 30. Of these ducts, the duct 18 leads via the axial passages 20 through a push rod base 21 to a storage pressure chamber 22 containing a push rod 23 carried by the push rod base 21. The storage pressure chamber 22 also contains a strong return spring 24 for the booster piston 30. The other duct 19 leads into a chamber 25 surrounding the push rod extension 12; a radial duct 26 exists from the chamber 25 and leads to a cylindrical recess (pressure chamber) 27 at the booster piston 30. The recess 27 permanently communicates with a junction 28 connected via a line 29 with the brake circuit II.

The storage pressure chamber 22 of the brake booster 1 is separated from the hydraulic main cylinder 3 by means of a wall 31 possessing sealing means for its penetration by the free end 32 of the push rod 23.

The end 32 of the push rod 23 protrudes into a primary pressure chamber 33 of the main cylinder 3. The chamber 33 is bounded by a piston 34 of a double piston 34, 35. The pressure chamber 33 is likewise connected to the brake circuit II via a branch line 36.

The two pistons 34 and 35 are fixedly attached to each other by means of a conical intermediate piece 38, whose part having the smaller diameter faces the secondary piston 35. A return spring 39, whose other end thrusts against the base of the main cylinder 3, acts upon the piston 35. A chamber 40 located between the base and the piston 35, and in which the spring 39 is located, serves as a secondary pressure chamber of the main cylinder 3. A line 41 is connected to the chamber 40 and leads to the brake circuit I. The chamber 40 can communicate via a vent hole 49 with a refill container 50.

An indicator device 42 which indicates the position of the double piston 34, 35 is provided at the main cylinder 3. The indicator 42 is not described in detail since it is not part of the inventive aspect of this disclosure.

Attached to the storage pressure chamber 22 is a pressure line 52 containing a check valve 53 opening toward the storage pressure chamber 22. The pressure line 52 connects to a pump 54 and to a parallel reservoir 55. The suction side of the pump 54 connects to a reservoir 43 linked via a line 43' to a junction 44 of the brake booster 1. The junction 44 communicates permanently with a cylindrical recess 45 of the booster piston 30. The recess 45 communicates permanently both with a refill container 46 via a hole 56, as well as with a relief chamber 47 in the booster piston 30. The relief chamber 47 contains the travel spring 5 for the actuating rod 4.

A control valve 51 of a lockage avoidance system, not further described here, is inserted into the brake circuit II. This control valve 51 is described in detail in Applicant's copending U.S. Patent Application Ser. No. 703,799, filed on July 9, 1976. Its function is to monitor the pressure modulation in the brake circuit II. The double piston 34, 35 moves in accordance with the given pressure set at the control valve 51 and then correspondingly varies the pressure in the brake circuit I. However, it is also possible to route the line 41 of the brake circuit I through the control valve 51 and to embody the control valve 51 as a multi-position valve, so that different paths could be opened or closed for each of the lines 26, 29 and 41.

The disclosed brake booster operates as follows:

The movable parts of the brake booster assume the positions illustrated in the drawing when the brake has been released. When, during braking, the pedal 2 is actuated, the outlet valve 8 is closed by means of the push rod 6 after the travel spring 5 bridges the gap between the rods 4 and 6. The closure of the outlet valve 8 interrupts the connection of the brake circuit II with the refill container 46 and with the reservoir 43.

During a continued movement of the pedal 2, the extension 12 of the push rod 6 pushes the inlet valve 7 open. Pump pressure from the enlargement 16 can now propagate via the control pressure chamber 27, the junction 28 into the line 29 to the brake circuit II. However, this pressure also acts in the primary pressure chamber 33 via the line 36. The double piston 34, 35 is displaced to the left, against the force of the spring 39. After the piston 35 travels past the vent hole 49, the pressurized fluid in the chamber 40 is sent to the brake circuit I via the line 41. The pressure in the brake circuit I is therewith dependent upon the pressure in the brake circuit II regulated by means of the control valve 51 during the lockage avoidance mode. The separation wall 31 between the storage pressure chamber 22 and the primary pressure chamber 33 makes that kind of regulation possible.

What is claimed is:

1. In a hydraulic brake booster for a vehicular brake system, the system having a brake pedal actuator and a front and rear brake circuit connected to the brake booster, the brake booster comprising: a booster cylinder; a booster piston within the booster cylinder defining a storage pressure chamber, a control pressure chamber and a relief chamber; a control valve means which controls the interconnection of the storage pressure chamber with the control pressure chamber and the control pressure chamber with the relief chamber; a travel limiting spring connected to the control valve means and adapted to be connected to the brake pedal actuator; and a hydraulic dual-circuit main cylinder connected to the booster cylinder, the dual-circuit main cylinder including a double piston defining a primary and secondary pressure chamber for pressurizing the rear and front brake circuits, respectively, the improvement comprising:

a separating wall connected to the booster cylinder and the dual-circuit main cylinder separates the storage pressure chamber from the primary pressure chamber, with the surface of the booster piston which defines the storage pressure chamber facing the primary pressure chamber, and with the dual-circuit main cylinder having means for connecting the primary pressure chamber to the rear brake circuit.

2. The hydraulic brake booster as defined in claim 1, wherein the booster cylinder includes means for connecting the control pressure chamber to the rear brake circuit.

* * * * *